United States Patent [19]

LaPalme

[11] Patent Number: 4,977,513

[45] Date of Patent: Dec. 11, 1990

[54] CIRCUIT BREAKER CURRENT MONITORING

[75] Inventor: Stephen G. LaPalme, Cape Porpoise, Me.

[73] Assignee: Power Solutions, Inc., Kennebunk, Me.

[21] Appl. No.: 113,341

[22] Filed: Oct. 19, 1987

Related U.S. Application Data

[63] Continuation of Ser. No. 642,120, Aug. 20, 1984, abandoned.

[51] Int. Cl.$^5$ .............................................. H02H 7/26

[52] U.S. Cl. .................................... 364/483; 324/424; 340/638; 361/93

[58] Field of Search ....................... 364/483, 492, 900; 324/424; 361/93, 114; 340/638, 639, 652, 664

[56] References Cited

U.S. PATENT DOCUMENTS

| | | | |
|---|---|---|---|
| Re. 31,774 | 12/1984 | Fletcher et al. | 364/483 |
| 3,735,201 | 5/1973 | May | 340/638 X |
| 4,041,370 | 8/1977 | Schroder | 323/210 |
| 4,240,149 | 12/1980 | Fletcher et al. | 364/483 |
| 4,241,336 | 12/1980 | Schonken | 340/664 X |
| 4,272,816 | 6/1981 | Matsumoto | 364/483 |
| 4,331,997 | 5/1982 | Engel et al. | 361/93 |
| 4,362,986 | 12/1982 | Burke et al. | 324/113 X |
| 4,400,775 | 8/1983 | Nozaki et al. | 364/200 |
| 4,443,854 | 4/1984 | Pflanz et al. | 364/483 |
| 4,484,271 | 11/1984 | Miu et al. | 364/200 |
| 4,497,031 | 1/1985 | Froehling | 364/557 X |
| 4,530,024 | 7/1985 | Brady, Jr. | 361/93 X |
| 4,550,360 | 10/1985 | Dougherty | 364/483 X |
| 4,577,279 | 3/1986 | Salowe | 364/483 |
| 4,612,617 | 9/1986 | Laplace, Jr. et al. | 364/483 |
| 4,620,156 | 10/1986 | Alvin et al. | 324/424 |
| 4,631,625 | 12/1986 | Alexander et al. | 364/483 |

FOREIGN PATENT DOCUMENTS

| | | | |
|---|---|---|---|
| 0113965 | 9/1980 | Japan | 324/424 |

OTHER PUBLICATIONS

Richter, R., "Performance Testing of a three-phase encapsulated $SF_6$-insulated 8D.6 circuit breaker for 145 kv 31.5 KA", *Siemens Review*, vol. 43, No. 5, pp. 210–213, May 1976.

Bron, O. B., "Determining the maximum interrupted current of switchgear", *Sov. Electr. Eng. (USA)*, vol. 48, No. 12, (1977), pp. 66–69.

*Primary Examiner*—Joseph L. Dixon

*Attorney, Agent, or Firm*—Fish & Richardson

[57] ABSTRACT

A circuit breaker monitoring system for monitoring three-phase circuit breakers includes three channels that convert a respective phase current through a respective set of circuit breaker contacts into a sequence of digital signals each representative of an instantaneous value of current through the contacts. Each channel includes a transformer having a primary winding that receives current corresponding to that through the breaker contacts. A resistor across the secondary winding develops a voltage proportional to the current. An input buffer voltage follower couples this voltage to the input of a high-speed 12-bit bipolar analog-to-digital converter that provides the digital signals. A microprocessor coupled to a 12K RAM working memory, a 4K EPROM that may store breaker monitor software and a 2K $E^2$PROM that may store programmable operating parameters and digital signals representative of accumulated fault current, processes the digital signals to provide a digital RMS current signal representative of the RMS value of the current through breaker contacts immediately after opening each time a source of a non-maskable CPU interrupt signal provides that signal in response to the occurrence of auxiliary breaker contacts changing state. The microprocessor is coupled through a parallel input output interface to a 20-character LCD alphanumeric display and to relays for indicating an alarm condition when breaker contacts need servicing, including extinguishing a green light and illuminating a red light. Another parallel input/output interface intercouples the microprocessor and a keyboard. A serial input output interface may couple a computer or printer with the microprocessor and both are coupled to a counter timer clock. A real time clock with battery backup provides date and time information.

5 Claims, 2 Drawing Sheets

CIRCUIT BREAKER CURRENT MONITORING

The present invention relates in general to circuit breaker current monitoring and more particularly concerns novel apparatus and techniques for providing signals representative of the RMS fault current flowing through circuit breaker contacts to facilitate determining a circuit breaker being monitored requires maintenance.

High-current circuit breakers respond to current overloads in a circuit being protected by opening normally closed contacts in series with the power line. The opening contacts develop an arc therebetween that deteriorates the contacts to progressively increase contact resistance and introduce undesired power losses and voltage drops. The resistance may become so high as to damage the circuit breaker from overheated contacts.

A typical prior art approach involves periodically replacing circuit breaker contacts well before an increase in contact resistance sufficient to result in power interruption. In a typical program contact replacement occurs at prescribed time intervals, even though a particular set of contacts may not have separated while carrying current sufficiently to require replacement. This replacement policy results in relatively high costs for labor and materials. Furthermore, a particular contact set may have interrupted so frequently that the contacts fail before the scheduled replacement time.

Another approach is described in Japanese Published Patent Application 59-47915 published on March 17, 1984. That publication discloses a control device which receives a digital representation of the main circuit current and trips the breaker when an overcurrent arises. A nonvolatile memory records the number of times the breaker trips and at least one value corresponding to the cumulative value of the overcurrent. An output device provides an alarm signal when the cumulative value of the overcurrent exceeds a predetermined limit.

It is an important object of this invention to provide improved methods and means for monitoring circuit breaker current.

BRIEF SUMMARY OF THE INVENTION

According to the invention, there is means, such as a transformer that drives a resistor to develop a voltage representative of circuit breaker current, analog-to-digital conversion means for providing a sequence of digital sample signals representative of the developed voltage, microprocessor means for processing the digital signals to provide a signal related to the integral of the magnitude of the arc current during breaking, and means for providing an indication of this current. Preferably, there is means for providing a limit signal representative of predetermined acceptable accumulated current limit to provide an alarm signal indicating the contacts are ready for servicing.

According to another feature of the invention, there is a source of a nonmaskable CPU interrupt signal responsive to the occurrence of impending breaker contact interruption for directing the microprocessor means to process the digital signals then being provided during contact opening.

Numerous other features, objects and advantages of the invention will become apparent from the following specification when read in connection with the accompanying drawing, in which

DETAILED DESCRIPTION

Figure 1A:
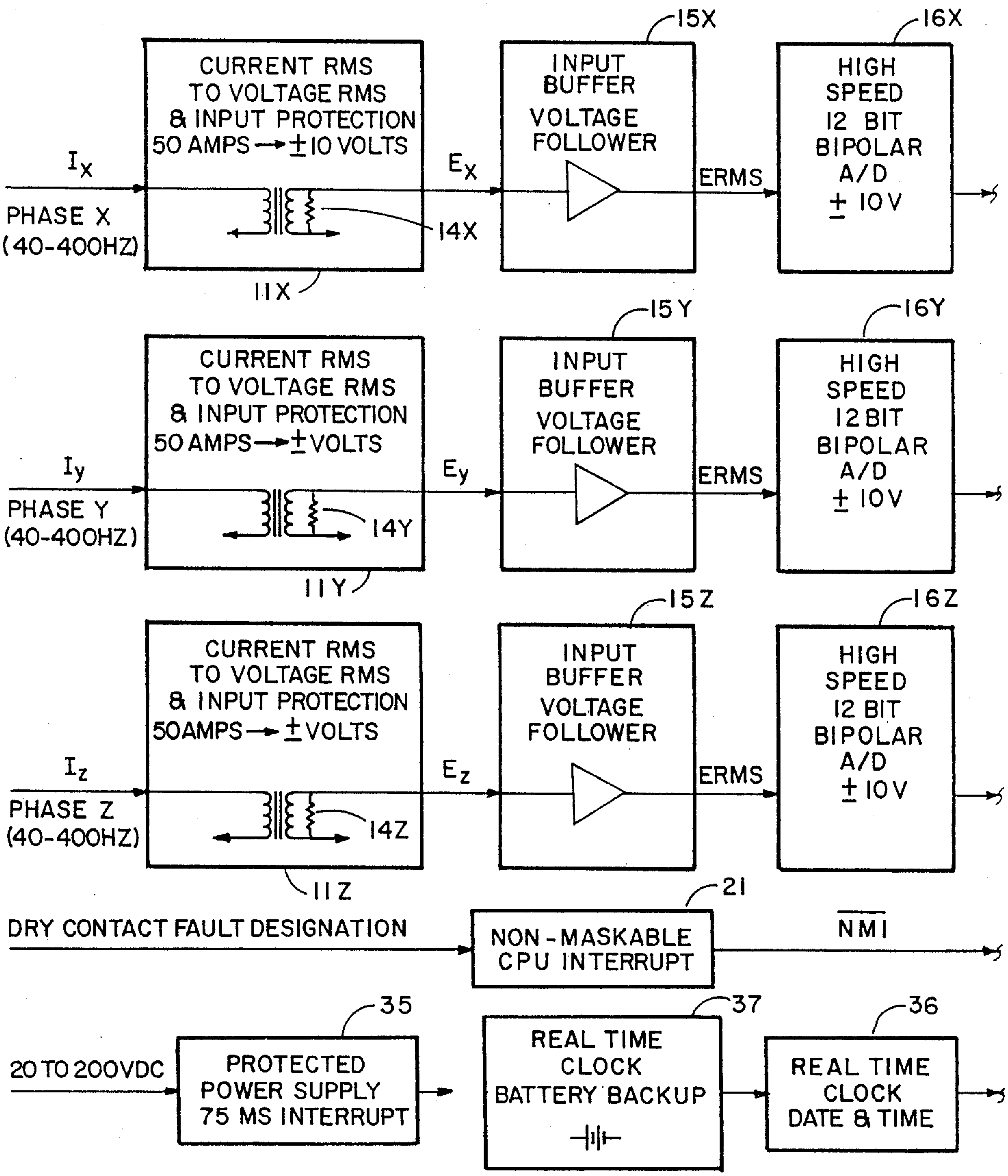
FIGS. 1A and 1B are a block diagram illustrating the logical arrangement of a system according to the invention.
Figure 1B:
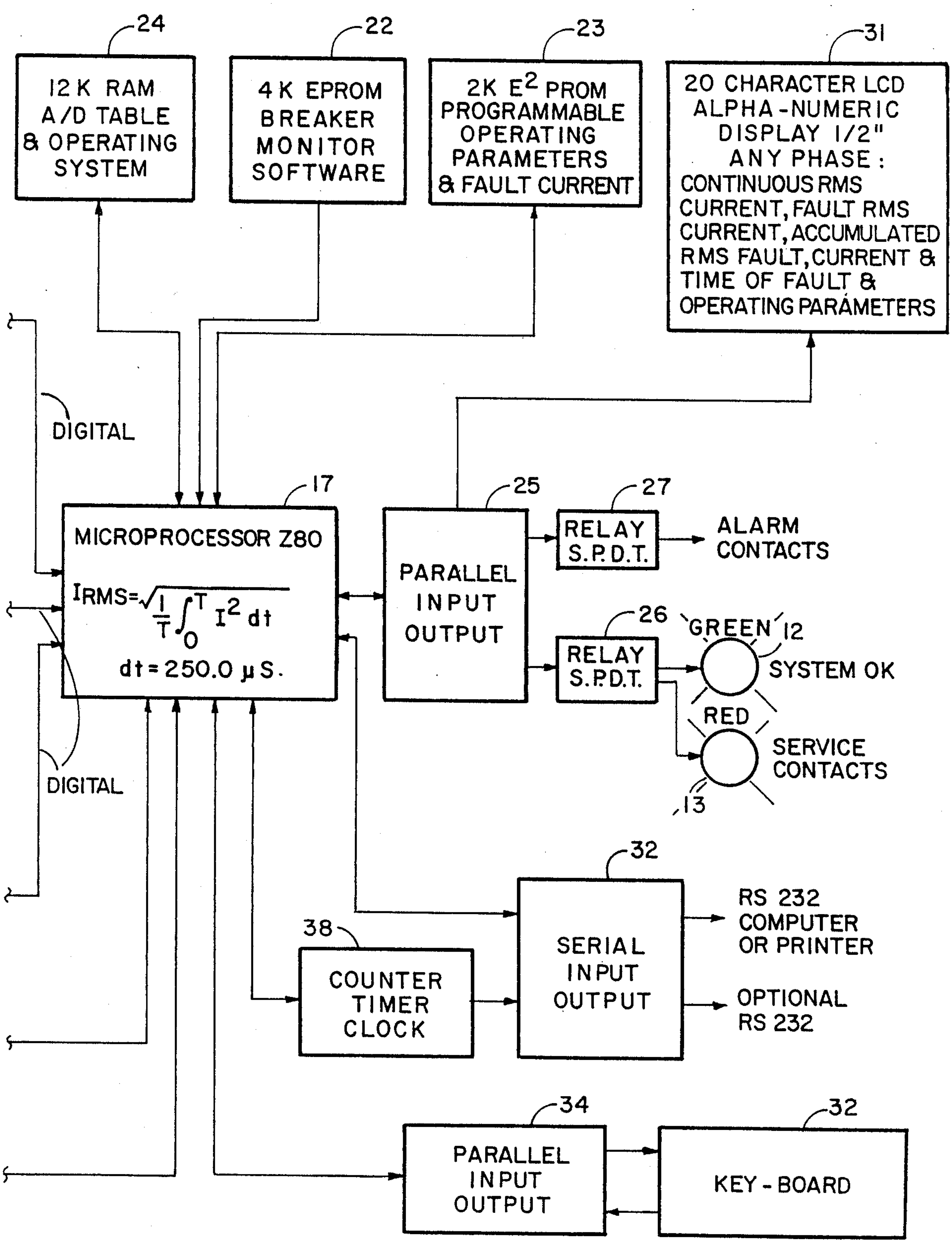

With reference now to the drawing, there is shown a block diagram illustrating the logical arrangement of a system according to the invention for monitoring breaker current. In this example for monitoring three-phase circuit breaker contacts, currents of phases designated x, y and z are applied to primary windings of transformers **11*x*, 11*y*, and 11*z*, respectively. The system indicates satisfactory operation when green light 12 is illuminated and the need to service contacts when red light 13** is illuminated.

Resistors, such as **14*x*, 14*y* and 14*z* across the secondary winding of transformers 11*x*, 11*y* and 11*z*, respectively, develop a voltage proportional to the associated breaker contact current that is coupled by input buffer voltage followers 15*x*, 15*y* and 15*z*, respectively, to provide voltages to high speed 12-bit bipolar analog-to-digital converters 16*x*, 16*y* and 16*z*, respectively. These analog-to-digital converters provide a sequence of digital signals representative of the input analog voltage, and hence the breaker contact current, of the associated phase to microprocessor 17 for storage in 12K RAM 24 as the A/D table. These stored sample signals are processed by microprocessor 17 to provide the root mean square value for each phase. Upon the occurrence of a fault indicated by a signal provided by nonmaskable CPU interrupt signal source 21** in response to the occurrence of a fault indication, the RMS value thus provided characterizes that of the breaker contact current immediately following breaker contact opening.

The program steps for providing the root mean square may be any known technique for making the indicated computation over the time interval beginning with the start of contact separation and extending sufficiently long, typically 1½ to 2 cycles at fundamental frequency, to embrace the interval in which significant current continues to flow as the contacts move apart following the start of contact separation. The steps for this program may be stored in 4K EPROM 22. A 2K $E^2$PROM 23 may store RMS arc currents provided by Z80 microprocessor 17 and programmable operating parameters specifying acceptable limits.

12K RAM 24 is a working memory that may store operands and other parameters and an analog-to-digital table of the digital sample signals.

Parallel input output interface 25 may carry signals from microprocessor 17 for normally maintaining relay 26 so as to illuminate green light 12 or to operate it so as to extinguish bulb 12 and illuminate red light 13 while also operating relay 27 to enable an audible or other alarm. Parallel input output interface 25 may also provide digital signals to 20-character LCD alphanumeric display 31 that may selectively display continuous RMS current, fault or arc RMS current, accumulated RMS fault or arc current and time of fault or arc and operating parameters, such as fundamental frequency acceptable limits, auxiliary contact state, and current transform ratio. A cathode ray tube display capable of displaying a number of lines of data in accordance with well-known techniques may be coupled through serial input output interface 32. Interface 32 may also provide the information to an external computer or printer or to a modem or other external device.

A keyboard 33 may be coupled by parallel input output interface 34 to microprocessor 17 for entering appropriate data, such as acceptable parameter limits.

Preferably power is supplied to the apparatus from a protected power supply 35. A real time clock 36 with a battery back-up 37 may furnish current date and time information to microprocessor 17. Counter timer clock 38 coacts with microprocessor 17 and serial input output interface 32 to set data transfer rate.

Having briefly described the physical arrangement of the system, its mode of operation will be discussed. When circuit breaker contacts open while carrying current, an arc develops that contributes to pitting, oxidizing and carbonizing the contacts to reduce the conductivity of the contacts. This reduction is believed to be related to both the duration of the arc and the magnitude of the current during arcing. It has been recognized that the RMS value of the current waveform during arcing is a meaningful representation of the contact degradation on the occurrence of each break. Circuit breaker contact life is often specified by maximum accumulated RMS fault or arc current. A signal representative of the integral of the magnitude of the arc current after contact breaking should be useful in this regard.

The present invention represents an especially advantageous approach for measuring the RMS current. Current from each phase may flow through the primary of a transformer and be converted to a proportional voltage across a resistor 14. After buffering by voltage follower 15, this voltage is sampled typically at intervals of 250 microseconds to provide a sequence of digital signals representative of the instantaneous amplitude of the current flowing through the breaker contact. When a fault or arc indication is indicated by a nonmaskable CPU interrupt signal provided by source 21 when the breaker auxiliary contacts change state, microprocessor 17 transfers the digital sample signals to RAM after a predetermined time interval corresponding to the time interval between auxiliary contact state change and main breaker contact separation. Microprocessor 17, or an auxiliary processing unit, squares each sample, sums the squares for a predetermined time interval in which arc current flows following contact breaking, divides this sum by the number of samples and takes the square root of this quotient to provide a signal representative of the RMS current that flowed during this break. As contact resistance increases, the RMS current flow following contact break decreases, and a particular limit may be entered through keyboard 33 denoting a maximum acceptable accumulated RMS current value upon breaking to avoid the generation of an alarm signal. When the accumulated RMS current following breaking reaches this limit, an alarm condition is indicated by microprocessor 17 to operate relays 26 and 27 and produce an alarm signal while extinguishing green light 12 and illuminating red light 13. The digital sample signals are preferably processed in accordance with Simpson's rule to accurately provide the RMS value of the arc current. Alternatively, other numerical integration processes, such as rectangular and trapezoidal may be used.

Preferably, a number of RMS values for a set of sample signals are determined and averaged to determine a very accurate RMS value for that set. This averaging preferably comprises effectively sliding an RMS time window of duration corresponding to a period at fundamental frequency and making the determination for each time shift of a sample interval. This averaging reduces the error caused by fundamental frequency deviation.

Alternatively or additionally, microprocessor 17 may furnish each RMS fault or arc current to $E^2$PROM 23, and these values may be accumulated for each circuit breaker phase to provide a sum of RMS fault or arc currents related to both the number of interrupts and the total RMS current flowing after breaking. Appropriate maximum limits for these sums may be entered through keyboard 33 to indicate a maximum allowable summation of fault or arc RMS currents which, if exceeded, results in microprocessor 17 causing operation of relays 26 and 27 to produce an alarm, extinguish green light 12 and illuminate red light 13 to indicate the need for servicing contacts.

This information may also be displayed on display 31 along with other information indicated there, including an indication of RMS current then flowing while the breaker contacts are closed to enable monitoring the RMS current flowing through the breaker contacts while closed for various purposes, such as indicating when a load limit is about to be reached to facilitate transferring power over other circuits to avoid a service interruption.

The specific techniques for handling the data signals as described above are known in the art from the above description and are not described in undue detail herein to avoid obscuring the principles of the invention.

There has been described novel apparatus and techniques for breaker current monitoring that is especially useful for evaluating the condition of breaker contacts and indicating when service should be performed to minimize breakdowns while reducing labor and material costs. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Circuit breaker monitoring apparatus comprising, a source of a breaker contact current signal representative of the current flowing through circuit breaker main contacts for monitoring, converting means including analog-to-digital conversion means for converting said current signal to a sequence of digital sample signals representative of instantaneous amplitudes of said current signal, microprocessing means for processing said digital sample signals to provide a digital signal related to the integral of the magnitude of said current, storage means for storing digital signals, and a source of a nonmaskable CPU interrupt signal responsive to the occurrence of an indication when said circuit breaker main contacts will open for then providing said nonmaskable CPU interrupt signal to said microprocessing means for causing said microprocessing means to provide to said storage means a digital signal representation related to the integral of the magnitude of the current flowing through said circuit breaker main contacts immediately after opening.

2. Circuit breaker monitoring apparatus in accordance with claim 1 and further comprising means for processing said digital signals to provide a digital signal related to the RMS value of said current.

3. A method of circuit breaker monitoring which method includes the steps of, providing a breaker contact current signal representative of the current flowing through circuit breaker main contacts for monitoring, converting said current signal to a sequence of digital sample signals representative of instantaneous amplitudes of said current signal, processing said digital sample signals to provide a digital signal related to the integral of the magnitude of said current, providing a nonmaskable CPU interrupt signal when said circuit breaker main contacts are about to open to provide a digital signal representation related to the integral of the magnitude of the current flowing through said circuit breaker main contacts immediately after opening, and storing said digital signal representation.

4. A method of circuit breaker monitoring in accordance with claim 3 wherein said step of processing said digital sample signals to provide a digital signal related to the integral of the magnitude of said current includes providing a digital signal representative of the RMS value of said current, and said step providing a digital signal representation related to the integral of the magnitude of the current flowing through said circuit breaker main contacts immediately after opening causes the provision of a digital signal representation of the RMS current flowing through said circuit breaker main contacts immediately after opening.

5. A method of circuit breaker monitoring in accordance with claim 4 and further including the steps of, providing said digital sample signals for a time interval that is greater than a period at the fundamental frequency of said current, providing a sequence of intermediate RMS signals each representative of the RMS value of different contiguous sets of said digital sample signals of duration corresponding substantially to said fundamental period, and providing an averaged RMS signal representative of the average value of said intermediate RMS signals as said digital signal representation of the RMS current flowing through said circuit breaker main contacts immediately after opening.

* * * * *